D. L. CROFT.
Belt Tightener.

No. 201,596. Patented March 26, 1878.

Witnesses:
Donn P. Twitchell
S. M. Madden

Inventor:
D. L. Croft
By his attys.
Dodge & Son

UNITED STATES PATENT OFFICE.

DAVID L. CROFT, OF SPRINGFIELD, OHIO.

IMPROVEMENT IN BELT-TIGHTENERS.

Specification forming part of Letters Patent No. 201,596, dated March 26, 1878; application filed February 25, 1878.

*To all whom it may concern:*

Be it known that I, DAVID L. CROFT, of Springfield, in the county of Clarke and State of Ohio, have invented certain Improvements in Belt-Tighteners, of which the following is a specification:

My invention relates to a device of improved construction for the purpose of stretching or tightening machine-belts; and consists in the combination of two clamped heads with connecting-screws, provided with nuts and ratchet-levers for turning the same, the two levers being connected by a cross-bar, so that both nuts may be turned at the same time, and the ratchets being made adjustable, so that the two nuts may be turned independently, or in opposite directions, in order to strain the belt by applying a different strain to the two edges.

Figure 1:
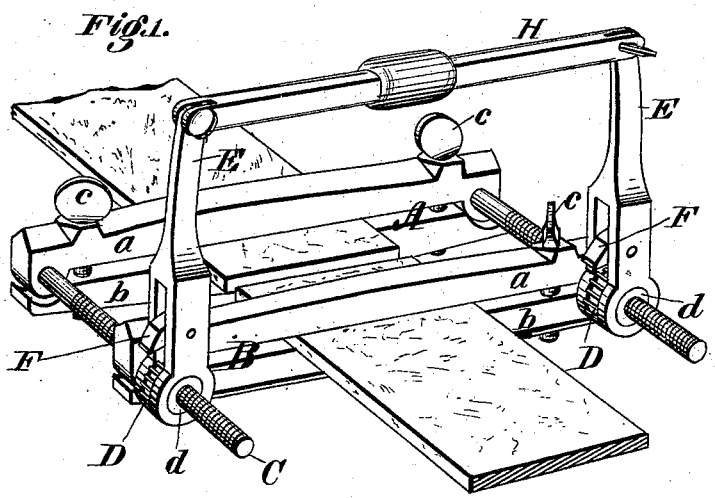
Figure 2:
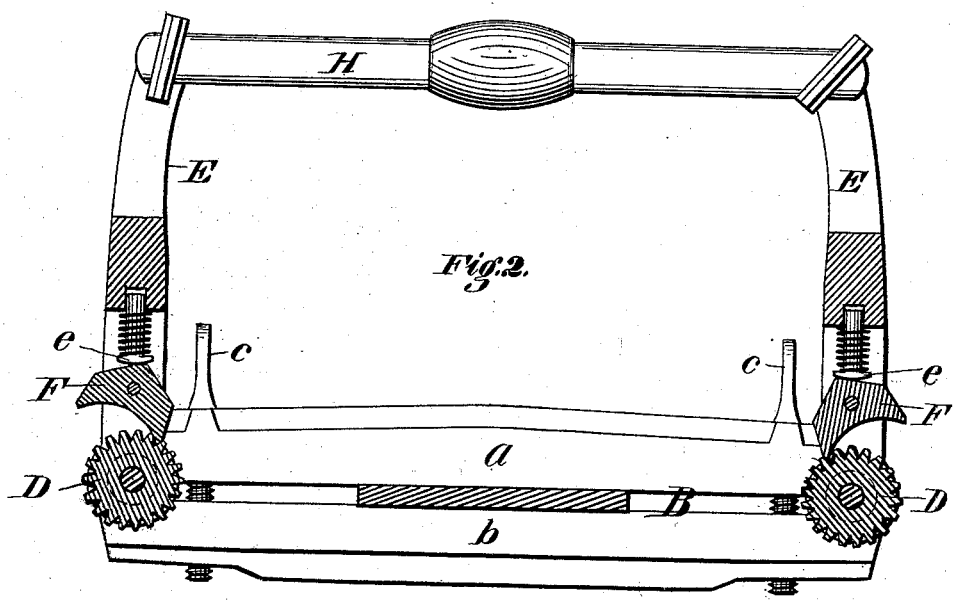
Figure 3:
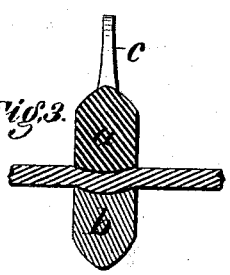

Figure 1 represents a perspective view of my device applied to a belt; Fig. 2, a longitudinal section of the same; Fig. 3, a transverse section of one of the clamped heads.

A and B represent two clamped heads, intended to be applied to the ends of the belt, respectively. Each head consists, as shown in Fig. 1, of two bars, *a* and *b*, connected at their ends by thumb-screws *c*, by which they may be drawn tightly together upon the belt inserted between them.

In order that the head may take a firm hold upon the belt without danger of cutting or injuring the same, their inner faces are made, one concave and the other convex in cross-section, as shown in Fig. 3, experience showing that when thus made they will hold a belt with great firmness, and without causing the slightest weakness therein.

The head A has secured to its opposite ends two screw-rods, C, which extend loosely through holes in the ends of the head B, thus connecting the heads with each other. On the outer end of each screw there is located a circular nut, D, having ratchet-teeth on its periphery, which nut is provided on opposite sides with sleeves or journals *d*, which receive the arms of a forked or split lever, E, which is provided with a pivoted pawl, F, acted upon by a spring-plunger, *e*, mounted in the lever, as shown in Fig. 2. The pawl has its upper end made of the form represented in Fig. 2, so that it may be adjusted to turn the nut to the right or the left, as required, or adjusted in an intermediate position, out of contact with the nut. The outer ends of the two levers E are connected by a cross-bar, H, by means of which the operator is enabled to vibrate the two levers in unison.

In using the device, the ends of the belt are clamped in the two heads, as shown in Fig. 1, the pawls adjusted in such manner as to tighten both nuts and draw their heads together, and the cross-bar H then moved to and fro, the effect of which is to operate both levers and their pawls, and cause the tightening of both ends alike, whereby the two heads are drawn directly toward each other, and the belt tightened on both edges alike. In the event of its being necessary to draw one edge of the belt more than the other, the pawl on the side which is not to be stretched may be adjusted to turn its nut backward, or thrown out of action entirely, in which case the movement of the bar H operates the other nut only.

It will be observed, on reference to the drawings, that the screws by which the clamps are connected are arranged opposite, or in line with the space between the clamp-bars, so that when the belt is introduced the screws are in line with or directly opposite its edges. It will be seen that when thus arranged the screws draw directly in line with the belt, and that the strain of the latter consequently has no tendency to tip or roll the clamps, as would be the case were the screws arranged either above or below the plane of the belt.

The arrangement shown enables the parts to work freely and easily, and prevents the danger which would otherwise exist of cramping the heads upon the screws, and causing the latter to become worn and bent.

It is obvious that instead of mounting the ends loosely upon the screws, as shown and explained, the latter may be provided with ratchet heads or wheels secured firmly thereon at one end, while the opposite end is arranged to screw through one of the clamping-heads, which will be tapped to receive it.

Having thus described my invention, what I claim is—

1. The combination of the two clamps and the connecting-screws with the two ratchet-nuts, the two levers and pawls, and the connecting-bar, substantially as shown.

2. In combination with the two heads and their connecting-screws and nuts, the two levers connected by the cross-bar, and provided with the independently adjustable and reversible pawls, substantially as and for the purpose described.

DAVID L. CROFT.

Witnesses:
WM. H. PRETZMAN,
M. J. BILLMAN.